2,951,759
Patented Sept. 6, 1960

2,951,759
ANIMAL GROWTH STIMULANT

John R. De Zeeuw and Frederick Sauer, Terre Haute, Ind., assignors to Chas. Pfizer & Co., Inc., New York, N.Y., a corporation of Delaware No Drawing. Filed Dec. 26, 1956, Ser. No. 630,464

5 Claims. (Cl. 99—2)

This invention is concerned with novel and highly useful animal feeds. In particular, it is concerned with animal feeds which are nutritionally balanced and which in addition contain very low percentages of one or more of a group of cortical steroid compounds.

Considerable research has been devoted in recent years to the development of highly effective animal feed products. This has led to the adoption of feeds containing in addition to the usual carbohydrate, protein and mineral sources various vitamins and other special nutrients and, even more recently, the use of antibiotics to stimulate the rapid and healthy growth of various types of animals.

It has now been found that the addition of a low level of one or more of a series of the so-called glucocorticoids to the diet of various simple stomached animals such that these animals receive the product over an extended period of time, that is a major portion of their active growth period, results in an acceleration of the rate of growth. This acceleration is over and above what is normally obtained with complete nutritious diets containing all the nutrients, vitamins, minerals and other factors known to be required for the maximum healthy growth of such animals. By "simple stomached animals" we refer to those other than ruminants. Included among the hormones which are effective for use in the improved animal feeds of this invention and in the novel process of this invention are a number of naturally occurring and synthetic compounds. These substances include hydrocortisone, cortisone, $\Delta^1$-dehydrocortisone, $\Delta^1$-dehydrohydrocortisone, 9-fluorohydrocortisone, 9-fluorocortisone, 14-hydroxyhydrocortisone and esters and other simple derivatives of these compounds as well as any other related compounds which possess, by the standard tests used for this purpose, glucocorticoid type activity. This activity is often measured by the ability to induce involution of the thymus in experimental animals and cause remission of various inflammatory effects in experimental animals.

The feeds used for supplementation with the glucocorticoids indicated above to form the improved animal feeds of this invention will vary to some extent from species to species depending upon the individual requirements of the animals in question. In general these diets will contain sources of carbohydrates such as grains, various types of flours, meals and other vegetable products, sugars, sugar syrups, hydrolyzed starch, etc. Additionally the diets will include a source of protein. This material may be derived from vegetable sources such as soy beans, peanuts, corn, and other similar materials, but in this case it may be necessary to supplement this source of protein with vitamin $B_{12}$. Other sources of protein from animal products may also be used and in this case supplementation with the vitamin may not be necessary. These protein sources include fish meal, meat scraps, tankage, and other materials of this nature. In addition the diet should contain sources of minerals such as calcium carbonate, calcium phosphate, iron, copper, zinc, manganese, magnesium, sodium, potassium, etc. If insufficient vitamins are present in the diet from vegetable and animal sources, then it will be necessary to supplement the diet with sources of vitamins such as A, D, thiamin, riboflavin, pantothenic acid, choline, etc. Diets such as have been recommended by the National Research Council are particularly useful as the standard type of diet for supplementation in accordance with the present invention.

In administering the products of this invention, it is preferred, as indicated above, to incorporate these materials in a balanced animal diet. It has previously been found that should certain levels of the glucocorticoid compounds be included in animal diets, there is encountered not a growth stimulating but a growth depressing effect. In the present invention, substantially lower levels have been found to have a remarkably valuable effect. In general it is preferred to use the glucocorticoids at a concentration not greater than about 1 mg. of the compound per gk. of the total feed given to the animal. In some cases, a somewhat higher level is useful, with a particular species of animal or when a particular glucocorticoid is used. A concentration in general of at least about 0.001 mg./kg. is satisfactory. A range of about 0.01 mg./kg. of feed to about 0.1 mg./kg. seems to be the most effective concentration. If it is desired to administer glucocorticoid by some route other than in the feed of the animal, for instance in drinking water or by direct admininstration in the form of tablets or by other routes, a level of not greater than approximately 0.3 mg./kg. of animal weight should be used. In general at least about 0.003 mg./kg. of body weight is preferred.

As indicated above, the simple stomached animals include rats, chickens, turkeys, pigs, dogs, cats, etc.

The following examples are given solely for the purpose of illustration and not to be construed as limitations of this invention, many variations of which are possible without departing from the spirit or scope thereof.

Example I

A series of weanling rats were fed on a nutritionally adequate diet suitable for normal growth of this type of animal. Part of the group had their diet supplemented with 0.1 mg. of hydrocortisone per kg. of diet. A second port of the group had its diet supplemented with 3.2 mg./kg. and a third with 100 mg./kg. In each of the subject groups there were ten males and ten females. Each of these groups was weighed separately and the total average gain in weight over a period of ten weeks was calculated. In the following table is summarized the results of this work.

| Level of Hydrocortisone (Mg./kg. diet) | Males, g. | Females g. |
|---|---|---|
| 0 | 232 | 140 |
| 0.1 | 258 | 153 |
| 3.2 | 235 | 143 |
| 100 | 63 | 61 |

It is obvious from the above tabulation that the addition of as little as 0.1 mg./kg. of the animal's diet induced an appreciable increase in the rate at which weight was gained. On the other hand, the addition of as little as 3.2 mg./kg. results in no appreciable gain in weight and the addition of 100 mg./kg. results in a very marked depression of growth.

Example II

A second experiment was conducted in which groups of male rats were fed a standard nutritious diet containing 17% protein and certain of these groups received, in addition, a supplement of hydrocortisone. The following table summarizes the results.

| Level of Hydrocortisone (Mg./kg. diet) | Weight Gained (4 weeks), g. |
|---|---|
| 0 | 126 |
| 0.01 | 154 |
| 0.1 | 149 |
| 1.0 | 150 |

These animals were not maintained as long as those in the first group but the effect of adding as little as 0.01 mg./kg. of hydrocortisone to the animal's diet was definitely effective in stimulating the rapid and healthy growth of these animals.

*Example III*

Groups of ten weanling male rats were fed on a completely balanced diet containing 17% protein. The average weight of each group was determined at the beginning and end of the experiment which was conducted over a period of four weeks. Various levels of hydrocortisone were added to the diet and the following table summarizes the results.

| Level of Hydrocortisone (Mg./kg. diet) | Average Weight Gained in Four Weeks, g. |
|---|---|
| 0 | 158 |
| 0.001 | 163 |
| 0.01 | 164 |
| 0.1 | 168 |

Thus, a definite weight gain was found to be due to the addition of a low level of hydrocortisone to the balanced diet that was used.

*Example IV*

Groups of ten weanling male rats each were fed on a completely balanced diet containing 17% of protein. The average weight of each group was determined at the beginning and end of the experiment which was conducted over a period of four weeks. Various levels of prednisolone were added to the diet and the following table summarizes the results.

| Level of Prednisolone (Mg./kg. diet) | Average Weight Gained in Four Weeks, g. |
|---|---|
| 0 | 142 |
| 0.001 | 155 |
| 0.01 | 153 |
| 0.1 | 159 |

This experiment clearly shows the effect of the addition of extremely low levels of prednisolone (Δ¹-dehydrohydrocortisone) to a balanced animal diet.

*Example V*

Groups of baby chicks containing ten animals each were fed on standard highly nutritious broiler rations. In the following table is summarized the results of the gain in weight of the animals over a period of four weeks on these diets and animals of the same type and on the same diet supplemented with 0.10 mg. of hydrocortisone per kg. of feed.

| Level of hydrocortisone (Mg./kg. diet) | Average Weight Gained (20% protein diet), g. | Average Weight Gained (20% protein diet), g. | Average Weight Gained (22% protein diet), g. | Average Weight Gained (22% protein diet), g. |
|---|---|---|---|---|
| 0 | 394 | 380 | 384 | 397 |
| 0.10 | 404 | 400 | 402 | 409 |

It is apparent from this tabulation that the addition of extremely low levels of hydrocortisone is effective in stimulating the growth of chickens.

*Example VI*

Groups of baby pigs were fed on a completely balanced diet previously proven highly useful for this type of animal. These animals were weaned at approximately six to eight days of age, fed over several days on a pre-starter diet containing 60.1% dry skimmed milk, 10.1% soybean oil, 9.9% glucose hydrate, 1.1% brewer's yeast, 0.4% of oxytetracycline feed supplement containing 5 g./lb. of oxytetracycline, 16% soybean oil meal and a complete vitamin and mineral supplement. The pigs were then fed a "starter diet" of fine ground yellow corn, rolled oats, soybean oil meal, glucose hydrate, dicalcium phosphate, iodized salt, soybean oil, oxytetracycline supplement, vitamin mix and mineral mix. The starter feed for some of the groups was supplemented with a low level of hydrocortisone. This feed was commenced when the animals were approximately three weeks old and continued over a total of four weeks. The gain in weight during the period was recorded weekly. In the following table are summarized the results of this experiment.

| Level of Hydrocortisone (Mg./kg. diet) | Average Weight Gain (In 4 weeks), lbs./day | Feed Efficiency |
|---|---|---|
| 0 | 0.82 | 1.91 |
| 0.01 | 0.88 | 1.83 |
| 0.10 | 0.89 | 1.76 |

In this experiment the feed efficiency is recorded. This is pounds of feed required per pound of weight gained of the animal. The lower the figure the more efficient is the diet in use. It is obvious from this tabulation that the addition of a very low level of hydrocortisone to an otherwise complete diet for young pigs results in a very definite increase in rate of weight gained and improvement in feed efficiency.

What is claimed is:

1. A growth stimulating non-ruminant animal feed which comprises a complete animal diet together with at least about 0.001 mg. and not greater than about 1.0 mg. of a glucocorticoid per kilogram of feed.

2. A growth stimulating animal feed as claimed in claim 1 wherein the hormone is hydrocortisone.

3. A growth stimulating animal feed as claimed in claim 1 wherein the hormone is prednisolone.

4. A process for stimulating growth of a non-ruminant animal which comprises administering to said animal, over the major portion of its active growth period, a feed containing not in excess of about 1.0 mg./kg. of a glucocorticoid.

5. A process for stimulating the growth of a non-ruminant animal which comprises administering to said animal, over the major portion of its active growth period, not more than about 0.3 mg. of a cortical steroid hormone per day per kg. of animal body weight.

References Cited in the file of this patent

UNITED STATES PATENTS

| 2,824,546 | Klette | Feb. 25, 1958 |
| 2,880,135 | Eppstein | Mar. 31, 1959 |

FOREIGN PATENTS

| 636,908 | Great Britain | 1950 |
| 506,216 | Belgium | Oct. 31, 1951 |

OTHER REFERENCES

Wells et al.: Proc. Staff Meeting, Mayo Clinic, vol. 15 (1940), pp. 324–328.

Selye: Textbook of Endocrinology, University of Montreal, Montreal, Canada, 1947, page 167.

Kupperman et al.: J. A. M., vol. 159, No. 15, pp. 1447–9, December 1955.